United States Patent
Menath

(10) Patent No.: US 10,585,487 B2
(45) Date of Patent: Mar. 10, 2020

(54) GESTURE INTERACTION WITH A DRIVER INFORMATION SYSTEM OF A VEHICLE

(71) Applicant: Bayerische Motoren Werke Aktiengesellschaft, Munich (DE)

(72) Inventor: Andreas Menath, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 110 days.

(21) Appl. No.: 15/299,705

(22) Filed: Oct. 21, 2016

(65) Prior Publication Data
US 2017/0038851 A1 Feb. 9, 2017

Related U.S. Application Data

(63) Continuation of application No. PCT/EP2015/058327, filed on Apr. 16, 2015.

(30) Foreign Application Priority Data

Apr. 23, 2014 (DE) .................. 10 2014 207 637

(51) Int. Cl.
*G06F 3/01* (2006.01)
*B60K 35/00* (2006.01)
(Continued)

(52) U.S. Cl.
CPC .............. *G06F 3/017* (2013.01); *B60K 35/00* (2013.01); *G06F 3/011* (2013.01); *G06F 3/0485* (2013.01);
(Continued)

(58) Field of Classification Search
CPC .............. B60K 35/00; B60K 2350/106; B60K 2350/352; B60K 2350/1052; G06F 3/017;
(Continued)

(56) References Cited

U.S. PATENT DOCUMENTS 9,477,303 B2 * 10/2016 Fleischmann ........... G06F 3/011
9,785,330 B1 * 10/2017 Yang ..................... G06F 3/0488
(Continued)

FOREIGN PATENT DOCUMENTS

DE         42 01 934 A1    7/1993
DE    10 2006 037 154 A1   10/2007
(Continued)

OTHER PUBLICATIONS

Gordon Kurtenbach et al., "Gestures in Human-Computer Communication", The Art of Human-Computer Interface Design, 1990 (eleven (11) pages).
(Continued)

*Primary Examiner* — Christopher E Leiby
(74) *Attorney, Agent, or Firm* — Crowell & Moring LLP

(57) ABSTRACT

A control system is provided for moving and/or magnifying display content, wherein the control system includes: a display unit having display content; at least one camera, which is designed to record a sensing region in front of the display unit; a gesture-recognition unit, which is coupled to the at least one camera and is designed to recognize a predetermined gesture performed with a hand and a current position of the gesture in the sensing region; and a display-content adapting unit, which is designed to adapt the display content in accordance with a change of the current position of the gesture, in particular to move the display content accordingly in the event of a change of the position in a plane parallel to the display unit and/or to enlarge or reduce the size of the display content in the event of a change of the position toward or away from the display unit.

13 Claims, 1 Drawing Sheet

(51) Int. Cl.
*G06F 3/0485* (2013.01)
*G06F 3/0484* (2013.01)
*G06K 9/00* (2006.01)

(52) U.S. Cl.
CPC ..... *G06F 3/04845* (2013.01); *G06K 9/00355* (2013.01); *B60K 2370/146* (2019.05); *B60K 2370/1464* (2019.05); *B60K 2370/152* (2019.05); *B60K 2370/52* (2019.05); *G06F 2203/04806* (2013.01)

(58) Field of Classification Search
CPC ............... G06F 3/0485; G06F 3/04845; G06F 2203/04806; G06F 3/0304; G06F 3/04815; G06F 3/011; G06F 3/04812; G06K 9/00355
See application file for complete search history.

(56) References Cited

U.S. PATENT DOCUMENTS

| | | | |
|---|---|---|---|
| 2009/0158203 A1 | 6/2009 | Kerr et al. | |
| 2012/0062558 A1* | 3/2012 | Lee | G06F 3/017 345/419 |
| 2012/0218183 A1* | 8/2012 | Givon | G06F 3/017 345/157 |
| 2013/0055150 A1 | 2/2013 | Galor | |
| 2013/0157607 A1* | 6/2013 | Paek | H04W 4/90 455/404.1 |
| 2013/0204457 A1 | 8/2013 | King et al. | |
| 2014/0325373 A1* | 10/2014 | Kramer | G06F 3/017 715/740 |
| 2015/0149930 A1* | 5/2015 | Walkin | H04L 65/403 715/753 |

FOREIGN PATENT DOCUMENTS

| | | |
|---|---|---|
| DE | 10 2013 201 746 A1 | 8/2013 |
| DE | 10 2013 000 066 A1 | 7/2014 |
| EP | 1 408 443 A1 | 4/2004 |
| EP | 1 477 924 A2 | 11/2004 |
| WO | WO 2013/184704 A1 | 12/2013 |

OTHER PUBLICATIONS

International Search Report (PCT/ISA/210) issued in PCT Application No. PCT/EP2015/058327 dated Jul. 7, 2015, with English translation (six (6) pages).

German Search Report issued in counterpart German Application No. 10 2014 207 637.4 dated Dec. 3, 2014, with partial English translation (thirteen (13) pages).

* cited by examiner

GESTURE INTERACTION WITH A DRIVER INFORMATION SYSTEM OF A VEHICLE

CROSS REFERENCE TO RELATED APPLICATIONS

This application is a continuation of PCT International Application No. PCT/EP2015/058327, filed Apr. 16, 2015, which claims priority under 35 U.S.C. § 119 from German Patent Application No. 10 2014 207 637.4, filed Apr. 23, 2014, the entire disclosures of which are herein expressly incorporated by reference.

BACKGROUND AND SUMMARY OF THE INVENTION

The invention generally relates to the automatic recognition of gestures, performed by persons, by use of a computer (gesture recognition). In particular, the invention relates to a gesture interaction with a driver information system of a vehicle.

Within the context of a human-computer interaction, Kurtenbach et al. ("Gestures in Human-Computer Communication" in "The Art of Human-Computer Interface Design", pp. 309-317, 1990) define a gesture as a movement of a body which contains information. For example, waving at a departure is a gesture. In contrast, pressing a key on a keyboard is not a gesture since the movement of the finger on the way to the collision with the key is neither observed nor is significant since it is only of relevance which key has been pressed.

In vehicles, it is already known to perform an operation of vehicle components by means of an interpretation of gestures. DE 42 01 934 A1 shows a data processing system which recognizes gestures and translates these into commands for controlling the data processing system. EP 1 408 443 A1 also shows a system in which control of a function takes place via a gesture recognition which, for example, includes various gestures in the form of hand or finger positions which are detected by way of a 2D or 3D camera. The respective hand and finger positions are allocated corresponding actions. The interpretation utilizes both static gestures and also particular sequences of movements.

A further approach is the recognition of gestures by way of stereoscopy. EP 1 477 924 A2 shows, for example, a gesture recognition device for recognizing attitudes or gestures of a person on the basis of images of the person which have been recorded by two cameras.

Modern vehicles provide the vehicle driver with extensive information and control options, for example via a central display screen. In particular, the operation of modern navigation systems is a continuous subject matter of research in order to improve the operation by the vehicle driver particularly during the trip so that the vehicle driver is distracted as little as possible from the actual driving of the vehicle and his attention for the environment and the road traffic is impaired as little as possible. However, the control options by use of gesture recognition, described before, are frequently not very intuitive. For this reason, the attempt at simplification of operation of a vehicle component can frequently not be achieved since gestures of the driver are not always translated into the operating inputs intended by the driver or are not recognized at all. The consequence of this is that the actual operating process is longer than theoretically expected and the attention of the driver is distracted more.

It is an object of the present invention to provide an improved control option, particularly for controlling a map section of a navigation system or screen contents of a driver information system, for example of an implemented Internet browser, which overcomes the disadvantages in the prior art.

This and other objects are achieved in accordance with embodiments of the invention.

A core concept of the invention consists in controlling, for example moving and/or magnifying, a displayed map section of a navigation map of a navigation system or a comparable movable content on a central display unit of a driver information system via a gesture, preferably free-space gestures. By means of a special gesture, e.g. a pincer grip with two fingers, the display content on the central display can be adjusted in three dimensions (3D) in accordance with the position of a camera virtually available and movable in free space.

By way of the control system according to the invention, it is achieved that an intuitive operating sensation is conveyed to the driver or an operator due to a special relationship between the hand movement and the change of the display content. This simplifies the control of the navigation system or of the driver information system and makes it more reliable so that especially the driver is impaired less by an operating process in the driving of the vehicle.

The invention thus relates to a control system for moving and/or magnifying a display content of a display unit. The control system includes: (i) a display unit having display content, at least one camera which is designed to record a sensing region in front of the display unit, (ii) a gesture recognition unit which is coupled to the at least one camera and is designed to recognize a predetermined gesture performed with a hand and a current position of the gesture in the sensing region, and (iii) a display content adapting unit which is designed to adapt the display content in accordance with a change of the current position of the gesture, in particular to move the display content accordingly in the event of a change of the position in a plane parallel to the display unit and/or to enlarge or to reduce the size of the display content in the event of a change of the position toward or away from the display unit.

The control system can have two cameras for recording the sensing region in front of the display unit. The gesture recognition unit can thus determine the current position of the gesture in the sensing region by way of stereoscopy.

The at least one camera can be an infrared camera, a time-of-flight camera and/or a structured-light camera.

The actual gesture recognition can take place by way of a continuous sequence of images of a hand/finger position of a user by use of technical image analysis. In this context, two approaches are basically possible: the gesture recognition unit can contain a database with examples of relevant gestures which have been generated by way of a meridian of a multiplicity, for example via 1000 video analyses of various embodiments of the gesture. An optically detected gesture can then be compared with the database by way of image recognition algorithms and the relevant gesture can be recognized on the basis of the comparison in order to trigger the associated operating function. As an alternative, it is also possible to work with a so-called skeleton recognition wherein the hand and/or fingers are recognized in the image data and by use of a simplified skeleton model, predefined gestures are inferred.

In the actual recognition of the gestures, the image information is processed by image processing algorithms, known per se, which analyze the raw data and finally recognize the gestures. In this context, algorithms for pattern recognition can be used. To remove noise in the input data and for reducing the data, preprocessing of the image data can take place in a first step. Subsequently, features are extracted from the image data in order to recognize the gesture by way of a classification. For this purpose, it is possible to use, for example, Hidden Markov models, artificial neural networks and other techniques, known per se from research in artificial intelligence.

The gesture recognition unit and/or the display content adapting unit is or are preferably designed to move and/or to magnify the display content as long as the predetermined gesture is recognized. The sensing region is preferably a predetermined space in front of the display unit.

The display content adapting unit can be designed to enlarge or to reduce the size of the display content in the case of a change of the position of the gesture toward or away from the display unit by a factor. In this context, the factor preferably corresponds to a power of base 2 with the change of the distance between the position of the gesture and the display unit as exponent. By means of the power of 2 with the change of distance as exponent it is achieved that a doubling or halving of the display content shown is achieved via a defined movement of the gesture or hand of the user in the x direction. Thus, it is possible to change between very many magnifying factors with a single hand movement. The exponent can also be scaled additionally with a sensitivity factor.

The display content adapting unit can be designed to move the display content with a change in the position of the gesture in a plane in parallel to the display unit correspondingly in such a manner that a length of a movement of the display content corresponds to a distance of the movement of the gesture in the plane parallel to the display unit. That is, a hand movement over a distance of 10 cm in a plane parallel to the display unit to the right, also results in a movement of the display content by 10 cm to the right. This results in a perfect mental operating model for a user as a result of which the control is intuitive for a user.

The display content adapting unit can also be designed, as soon as the coordinates of the last position of the gesture have been acquired, to allow the display content to continue to run in accordance with a last sensed speed or the last speed sensed at which the position of the gesture has changed, and to slow down preferably continuously until it comes to a standstill. This control characteristic conveys to a user the feeling of being able to virtually bump or nudge the display content by way of the predetermined gesture.

The display content is preferably a map section of a map, e.g. a navigation map of a navigation system. The map data and thus the map can be stored, for example, in a database of the navigation system. The display content adapting unit is then used for adapting the map section in accordance with the change in the current position of the gesture.

The invention also relates to a vehicle, particularly a motor vehicle, having a driver information system which has at least one display unit for displaying graphical data, for example of a navigation system or of an Internet browser, and a control system according to the invention as described above, for moving and/or magnifying the display content.

The invention is particularly well suited for controlling display contents of a driver information system in a vehicle. However, the invention can also be basically implemented on smartphones, tablet computers or devices having a display, the content of which can be adapted by a user in accordance with the control system proposed here.

Further advantages, features and details of the invention can be obtained from the subsequent description in which exemplary embodiments of the invention are described in detail with reference to the drawings. Similarly, the aforementioned features and those also listed here can each be used by themselves or several of them in any combination. Functionally similar or identical components are provided to some extent with the same reference symbols. The terms "left", "right", "top" and "bottom" used in the description of the exemplary embodiments relate to the drawings in an orientation with normally readable figure designation or normally readable reference symbols. The embodiments shown and described should not be understood to be conclusive but have an exemplary character for explaining the invention. The detailed description is used to inform the expert which is why known circuits, structures and methods are not shown in detail or explained in the description in order not to impede the understanding of the present description.

Other objects, advantages and novel features of the present invention will become apparent from the following detailed description of one or more preferred embodiments when considered in conjunction with the accompanying drawings.

DETAILED DESCRIPTION OF THE DRAWINGS

The following description explains the proposed control of the display content of a display unit with the example of a control of a displayed map section of a navigation system. Naturally, the control described here can be basically transferred correspondingly to other display contents of a display unit of a driver information system. As a further example, an Internet browser integrated into the driver information system will be mentioned here in which then small contents can be focused—as in the case of the map section—with a short and fast gesture.

Figure 1:
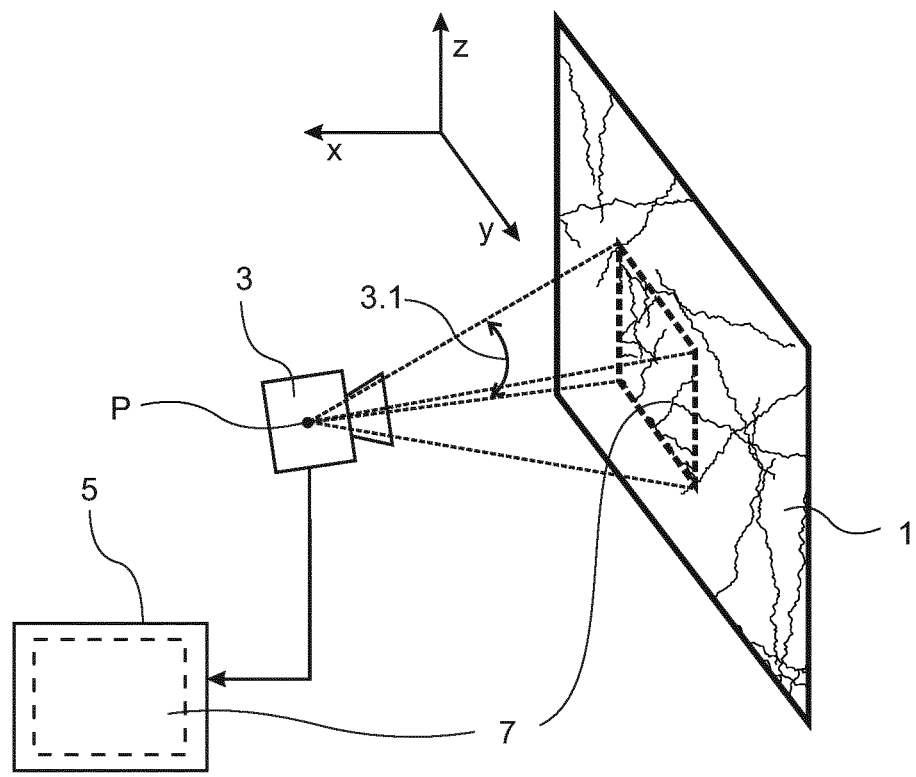
FIG. 1 illustrates the basic principle of a map section control.

FIG. 1 initially illustrates the basic principle of the map section control proposed here. From a (navigation) map 1 with graphically illustrated geographic data and road course data, a particular map section 7 is to be displayed on a display 5. The map section 7 is recorded with a camera 3 which is oriented toward the map 1. The image data detected from a position P by the camera 3 define the map section 7. In this context, an outer boundary of the map section 7 is determined essentially by the distance of the camera 3 from the map 1, an aperture angle 3.1 of the camera 3 and the format of the image sensor (not shown) of the camera 3. The image data are transferred from the camera 3 to the display unit 5 and displayed there.

The map section 7 can be displaced correspondingly by a change of the position P of the camera 3 in the y- and/or z-direction. By a change in the position P of the camera 3 in the x direction, the map section 7 can be zoomed. That is, when the position P is moved in the x direction toward the map 1, the map section 7 is correspondingly reduced in size. Since the display area of the display unit remains the same, this means that a smaller part of the map 1 is displayed on the display area which means that in the result, zooming took place into map 1. If the position P is moved away from map 1 in the x direction, the map section 7 is correspondingly enlarged. Since the display area of the display unit remains the same, this means that a larger part of map 1 is now displayed on the display area by which means zooming took place out of map 1.

According to the first aspect, the preceding basic principle is utilized for controlling a currently displayed map section 7 on the display unit 5 of a navigation system by way of a gesture control in free space. In this context, the position of a predetermined gesture G is recognized in the form of a particular hand/finger position and recalculated into a position P of the virtual camera 3 of FIG. 1. That is, an adaptation of the map section 7 is performed in dependence on the movement of position P of a recognized gesture G in accordance with the principle explained by means of FIG. 1.

Figure 2:
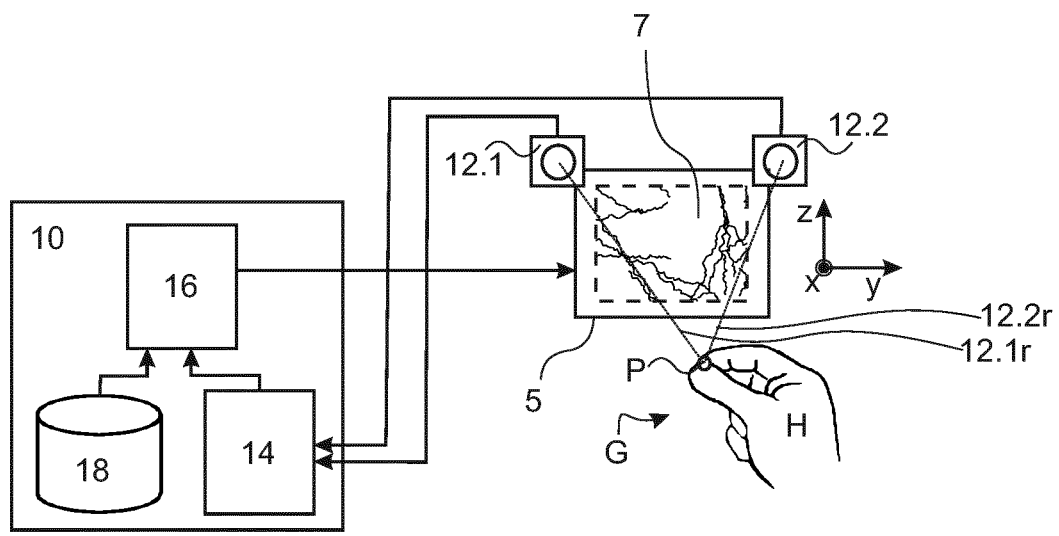
FIG. 2 diagrammatically shows the components of a navigation system with stereoscopic gesture recognition and gesture position recognition for adapting a map section according to the principle of FIG. 1.

In this respect, FIG. 2 diagrammatically shows the components of a navigation system with gesture recognition and stereoscopic gesture position recognition for adapting the map section 7 in accordance with the principle of FIG. 1. The basic components of a navigation system and its function are assumed to be known and will not be explained in greater detail here. The further components for gesture recognition and stereoscopic gesture position recognition, explained in the text which follows, and the image processing which can be implemented with software, and map section adaptation can be supplemented in a known navigation system.

FIG. 2 shows the display unit 5 of the navigation system on which a map section 7 is displayed. At the top two corners of the display unit 5, two cameras 12.1, 12.2 are arranged for gesture recognition. The two cameras 12.1, 12.2 provide for stereoscopic recognition of the position P of a recognized gesture G which is performed with a hand H. For the map section adaptation described here, a gesture G is preset in which the thumb and the indicating finger of the hand touch in a pincer-like manner as predetermined finger position, i.e. perform a so-called pincer grip.

The gesture recognition has the advantage that the intention of the user is clearly recognizable and the gesture can be distinguished from other hand movements. As a result, other hand movements within the area of recognition of the cameras 12.1, 12.2 do not lead to any (unintended) adaptation of the map section 7. That is, it is only when the predetermined gesture G is recognized that the map section adapting unit 16 is activated.

A gesture recognition unit 14 with the cameras 12.1, 12.2, can be a component of a control system 10 of the navigation system as separate hardware or can be connected to it or implemented by software routines of the navigation system which are present in any case. The gesture recognition unit 14 is designed both for gesture recognition and for determining the current position P of the gesture G in free space in front of the display unit 5. The gesture recognition is implemented in a familiar manner using corresponding methods of image processing and pattern recognition. The current position P of the gesture G is essentially determined on the basis of the knowledge of the positions of the cameras 12.1, 12.2 and the current angle in space of the lines of sight 12.1r, 12.2r of the respective camera 12.1, 12.2 starting from position P of the gesture G. By this means, the gesture recognition unit 14 can determine the coordinates of position P with sufficient accuracy by use of known calculations of the stereoscopy.

The 3D coordinates of position P of the gesture G are preferably acquired in short time intervals, e.g. every 20 ms, and provided to the map section adapting unit 16 in order to ensure a fluid adaptation of the map section 7 (movement and/or magnification).

As soon as the gesture recognition unit 14 has recognized the predetermined gesture G, the coordinates of the (gesture) position P are acquired by the gesture recognition unit 14 as long as the predetermined hand/finger position for the gesture G is retained by the user. The coordinates ($G_{nx}$, $G_{ny}$, $G_{nz}$) form the basis for the adaptation of the map section 7, based on this, by the map section adapting unit 16. The entire map 1 (compare FIG. 1) is stored in a database 18 of the navigation system, the map section adapting unit 16 being coupled to the database, i.e. having access to the map data. Known navigation systems also have possibilities for adjustment of the current map section. That is, the improved map section adapting unit 16, proposed here, can be supplemented at this point with a known navigation system.

Coordinates of the position acquired during this process can be marked with a running index n and stored, the index n running from 1 to k. The last coordinates ($G_{kx}$, $G_{ky}$, $G_{kz}$) correspond to the last position $P_k$ at which the hand H performed the predetermined gesture G or left the technically required sensing region in front of the display unit 5. That is, during an interaction, the gesture recognition unit 14 acquires k position coordinates:

x coordinate: $G_{1x}$, $G_{2x}$, $G_{3x}$, $G_{4x}$, $G_{5x}$, ..., $G_{kx}$
y coordinate: $G_{1y}$, $G_{2y}$, $G_{3y}$, $G_{4y}$, $G_{5y}$, ..., $G_{ky}$
z coordinate: $G_{1z}$, $G_{2z}$, $G_{3z}$, $G_{4z}$, $G_{5z}$, ..., $G_{kz}$ A particular space above or in front of the display unit 5 can be defined as a recognition area. Coordinates $G_{nxyz}$ of position P are calculated by the gesture recognition unit 14 as control input to the map section adapting unit 16 only when the defined gesture G is recognized and the current position P of gesture G is within the recognition area. If a position P outside the recognition area is determined or reached during an active interaction or if the defined hand position is left, the interaction is aborted. That is, there will then not be any further adaptation of the map section 7.

In order to reach the representation of a particular map section 7 on the display unit 5, the current position P of gesture G is recalculated into a position of a virtual camera (corresponding to camera 3 in FIG. 1) which can be moved arbitrarily in three dimensions. The calculated position $P_{VC}$ of the virtual camera and an aperture angle allocated to the virtual camera then define the map section 7 currently to be displayed on the display unit 5.

From the currently sensed position P of gesture G with the coordinates ($G_{nx}$, $G_{ny}$, $G_{nz}$), the gesture recognition unit 14 calculates the corresponding position ($P_{VCnx}$, $P_{VCny}$, $P_{VCnz}$) of the virtual camera preferably in accordance with the following relationships, expressed as formulae:

$$P_{VCnx} = P_{VC1x} * 2^{((G_{nx} - G_{1x})/f_x)} \tag{1.1}$$

$$P_{VCny} = P_{VC(n-1)y} + P_{VCnx} * (G_{ny} - G_{(n-1)y}) * f_y \tag{1.2}$$

$$P_{VCnz} = P_{VC(n-1)z} + P_{VCnx} * (G_{nz} - G_{(n-1)z}) * f_z \tag{1.3}$$

where $f_x$, $f_y$, $f_z$ are sensitivity parameters and n is the index for the positions P sensed during an interaction, where, as explained above, $1 < n \leq k$ applies.

The respective x coordinate corresponds to the current distance of gesture G from the display unit 5 or, respectively, to the height of the virtual camera above map 1 of which map section 7 is displayed on the display unit 5. The relationship between the x coordinate of camera $P_{VCnx}$ and the x coordinate of gesture position $G_{nx}$ is used for reducing or enlarging (zooming) the size of the map section. Using the power of 2 has the result that by means of a defined movement of the gesture G or hand H in the x direction, a doubling of the map size shown is thus achieved. By this means, it is possible to change between very many zooming factors with a hand movement.

Furthermore, the y and z coordinates $P_{VCny}$, $P_{VCnz}$ of the virtual camera are dependent on the x coordinate $P_{VCnx}$ in such a manner that by a corresponding adjustment of the sensitivity parameters $f_y$ and $f_z$, the length of a map movement on the display unit 5 corresponds to the distance of the movement of the gesture G or hand H in the y and/or z direction. That is, for example, that a hand movement by 10 cm to the right results in a map movement by 10 cm to the right. This results in a perfect mental model as a result of which the control is intuitive for a user.

According to a further advantageous aspect of the display content control, the adaptation of the display content can take into consideration the motion dynamics of gesture G or hand H during the input. Map section adapting unit 16 is designed for this, and after the last coordinates $G_k$ of position P of gesture G have been sent, to allow the map section 7 to continue to run over the map 1 with the last sensed speed of hand H or gesture G, the movement slowing down continuously until it comes to a standstill. This characteristic imparts to the user the feeling that one can "nudge" the map. This characteristic can be mapped with the following relationships and settings expressed in a formula:

$$\text{last\_vel}_{xyz} = (G_{kxyz} - G_{(k-1)xyz})/\text{steplength} \quad (2.1)$$

$$S_{nxyz} = 0.5 * b * (\text{steplength} * (n-k))^2 + \text{last\_vel}_{xyz} * \text{steplength} * (n-k); \quad (2.2)$$

$$(\text{last\_vel}_{xyz} > 0)$$

$$S_{nxyz} = -0.5 * b * (\text{steplength} * (n-k))^2 + \text{last\_vel}_{xyz} * \text{steplength} * (n-k); \quad (2.3)$$

$$(\text{last\_vel}_{xyz} < 0)$$

$$P_{VCnx} = P_{VC1x} * 2^{((G_{kx} + S_{nx})/f_x)} \quad (2.4)$$

$$P_{VCny} = P_{VC(n-1)y} + P_{VCnx} * (S_{ny} - S_{(n-1)y}) * f_y \quad (2.5)$$

$$P_{VCnz} = P_{VC(n-1)z} + P_{VCnx} * (S_{nz} - S_{(n-1)z}) * f_z \quad (2.6)$$

where n>k means that the map section 7 continues after the last gesture position recognized, b is a preset braking factor, e.g. 0.3 m/s, "steplength" is a steplength in accordance with the current frame rate of the cameras 12.1, 12.2, e.g. 20 ms at 50 frames/s, and "last_vel$_{xyz}$" is the last speed of the movement of the gesture G or hand H, e.g. $(G_{kxyz} - G_{(k-1)xyz})/\text{steplength}$.

The continuation of the map section described ends as soon as $s_{nxyz}$ reaches a defined minimum or a new series of coordinates of a position P of a recognized gesture G is sent.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for moving and/or magnifying display content, comprising:
    a display unit having the display content;
    at least one camera which is designed to record a sensing region in front of the display unit;
    a gesture recognition unit which is coupled to the at least one camera and is designed to recognize a predetermined gesture performed with a hand and a current position of the gesture in the sensing region; and
    a display content adapting unit which is designed to adapt the display content in accordance with a change of the current position of the gesture, including moving the display content accordingly in the event of a change of the position in a plane parallel to the display unit and/or enlarging or reducing the size of the display content in the event of a change of the position toward or away from, respectively, the display unit;
    wherein the display content adapting unit is designed to move the display content, in horizontal and vertical directions, distances equal to distances by which the hand is moved in the horizontal and vertical directions;
    wherein the display content adapting unit is designed, as soon as a last position of the gesture has been acquired, to allow the display content to continue to run for a predetermined amount of time at a last sensed speed at which the position of the gesture has changed, and thereafter to slow down continuously until the display content comes to a standstill; and
    wherein the gesture recognition unit calculates a corresponding position of the at least one camera in each of x, y, and z directions in accordance with relationships including:

$$P_{VCnx} = P_{VC1x} * 2^{((G_{nx} - G_{1x})/f_x)},$$

$$P_{VCny} = P_{VC(n-1)y} + P_{VCnx} * (G_{ny} - G_{(n-1)y}) * f_y, \text{ and}$$

$$P_{VCnz} = P_{VC(n-1)z} + P_{VCnx} * (G_{nz} - G_{(n-1)z}) * f_z,$$

where $P_{VCnx}$, $P_{VCny}$, and $P_{VCnz}$ are the corresponding positions, G is the gesture, $f_x$, $f_y$, $f_z$ are sensitivity parameters, n is an index for the corresponding positions sensed during an interaction, and $1 < n \leq k$, where k is a number of position coordinates.

2. The control system as claimed in claim 1, wherein two cameras are provided for recording the sensing region in front of the display unit, and the gesture recognition unit determines the current position of the gesture in the sensing region by stereoscopy.

3. The control system as claimed in claim 1, wherein the at least one camera is an infrared camera, a time-of-flight camera and/or a structured-light camera.

4. The control system as claimed in claim 2, wherein the at least one camera is an infrared camera, a time-of-flight camera and/or a structured-light camera.

5. The control system as claimed claim 1, wherein the gesture recognition unit and/or the display content adapting unit are designed to move and/or to magnify the display content as long as the predetermined gesture is recognized.

6. The control system as claimed in claim 1, wherein, the sensing region is a predetermined space in front of the display unit.

7. The control system as claimed in claim 1, wherein the display content adapting unit is designed to enlarge or to reduce the size of the display content in the case of a change of the position toward or away from the display unit by a factor, the factor corresponding to a power of base 2 with a change of the distance between the position of the gesture and the display unit as exponent.

8. The control system as claimed in claim 1, wherein the display content adapting unit is designed to move the display content with a change in the position in a plane parallel to the display unit correspondingly such that a length of a movement of the display content corresponds to a distance of the movement of the position of the gesture in the plane parallel to the display unit.

9. The control system as claimed in claim 1, wherein the display content is a map section of a map which is stored in a database of a navigation system, and the display content adapting unit adapts the map section in accordance with the change in the current position of the gesture.

10. A vehicle, comprising:
a driver information system which has at least one display unit for displaying graphical data; and
a control system for moving and/or magnifying display content, including:
a display unit having the display content;
at least one camera which is designed to record a sensing region in front of the display unit;
a gesture recognition unit which is coupled to the at least one camera and is designed to recognize a predetermined gesture performed with a hand and a current position of the gesture in the sensing region; and
a display content adapting unit which is designed to adapt the display content in accordance with a change of the current position of the gesture, wherein the adaption includes moving the display content accordingly in the event of a change of the position in a plane parallel to the display unit and/or enlarging or reducing the size of the display content in the event of a change of the position toward or away from, respectively, the display unit;
wherein the display content adapting unit is designed to move the display content, in horizontal and vertical directions, distances equal to distances by which the hand is moved in the horizontal and vertical directions;
wherein the display content adapting unit is designed, as soon as a last position of the gesture has been acquired, to allow the display content to continue to run for a predetermined amount of time at a last sensed speed at which the position of the gesture has changed, and thereafter to slow down continuously until the display content comes to a standstill; and
wherein the gesture recognition unit calculates a corresponding position of the at least one camera in each of x, y, and z directions in accordance with relationships including:

$$P_{VCnx} = P_{VC1x} * 2^{((G_{nx}-G_{1x})/f_x)},$$

$$P_{VCny} = P_{VC(n-1)y} + P_{VCnx} * (G_{ny}-G_{(n-1)y}) * f_y), \text{ and}$$

$$P_{VCnz} = P_{VC(n-1)z} + P_{VCnx} * (G_{nz}-G_{(n-1)z}) * f_z),$$

where $P_{VCnx}$, $P_{VCny}$, and $P_{VCnz}$ are the corresponding positions, G is the gesture, $f_x$, $f_y$, $f_z$ are sensitivity parameters, n is an index for the corresponding positions sensed during an interaction, and $1 < n \leq k$, where k is a number of position coordinates.

11. The vehicle as claim in claim 10, wherein the vehicle is a motor vehicle.

12. The vehicle as claimed in claim 10, wherein the graphical data is graphical data of a navigation system.

13. The vehicle as claimed in claim 10, wherein the graphical data is graphical data of an Internet browser.

* * * * *